US009354954B2

(12) United States Patent
Thelen et al.

(10) Patent No.: US 9,354,954 B2
(45) Date of Patent: *May 31, 2016

(54) SYSTEM AND METHOD FOR ACHIEVING HIGH PERFORMANCE DATA FLOW AMONG USER SPACE PROCESSES IN STORAGE SYSTEMS

(71) Applicant: NetApp, Inc., Sunnyvale, CA (US)

(72) Inventors: Randy Thelen, Mountain View, CA (US); Garth Goodson, Fremont, CA (US); Kiran Srinivasan, Cupertino, CA (US); Sai Susarla, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,136

(22) Filed: Mar. 4, 2014

(65) Prior Publication Data

US 2014/0189434 A1 Jul. 3, 2014

Related U.S. Application Data

(63) Continuation of application No. 12/143,592, filed on Jun. 20, 2008, now Pat. No. 8,667,504.

(51) Int. Cl.
*G06F 9/54* (2006.01)
*G06F 11/07* (2006.01)

(52) U.S. Cl.
CPC ............ *G06F 11/0727* (2013.01); *G06F 9/544* (2013.01); *G06F 9/545* (2013.01)

(58) Field of Classification Search
None
See application file for complete search history.

(56) References Cited

U.S. PATENT DOCUMENTS

| 6,075,938 | A | 6/2000 | Bugnion et al. |
| 6,408,324 | B1 | 6/2002 | Wallace et al. |
| 7,424,710 | B1 | 9/2008 | Nelson et al. |
| 2004/0117593 | A1 | 6/2004 | Uhlig et al. |

(Continued)

FOREIGN PATENT DOCUMENTS

WO    WO-02/086730 A2    10/2002

OTHER PUBLICATIONS

International Search Report PCT/US2009/047818 dated May 4, 2010, pp. 1-3.
Written Opinion PCT/US2009/047818 dated May 4, 2010, pp. 1-4.
Supplemental European Search Report EP Application No. EP09767742 dated Jul. 19, 2012, 5 pages.
Non-Final Office Action Mailed Sep. 13, 2012 in Co-Pending U.S. Appl. No. 12/143,592 of Thelen, R., et al., filed Jun. 20, 2008.

(Continued)

*Primary Examiner* — Tuan Dao
(74) *Attorney, Agent, or Firm* — LeClairRyan, a Professional Corporation

(57) ABSTRACT

Fault isolation capabilities made available by user space can be provided for a embedded network storage system without sacrificing efficiency. By giving user space processes direct access to specific devices (e.g., network interface cards and storage adapters), processes in a user space can initiate Input/Output requests without issuing system calls (and entering kernel mode). The multiple user spaces processes can initiate requests serviced by a user space device driver by sharing a read-only address space that maps the entire physical memory one-to-one. In addition, a user space process can initiate communication with another user space process by use of transmit and receive queues similar to transmit and receiver queues used by hardware devices. And, a mechanism of ensuring that virtual addresses that work in one address space reference the same physical page in another address space is used.

22 Claims, 8 Drawing Sheets

(56) References Cited

U.S. PATENT DOCUMENTS

| | | |
|---|---|---|
| 2004/0216003 A1 | 10/2004 | Floyd et al. |
| 2004/0244011 A1 | 12/2004 | Morris et al. |
| 2005/0091029 A1* | 4/2005 | Traut .............................. 703/27 |
| 2005/0246453 A1 | 11/2005 | Erlingsson et al. |
| 2007/0130566 A1 | 6/2007 | van Rietschote et al. |
| 2008/0077937 A1 | 3/2008 | Shin et al. |
| 2008/0126762 A1 | 5/2008 | Kelley et al. |
| 2009/0113424 A1* | 4/2009 | Chen et al. ........................ 718/1 |
| 2009/0320042 A1 | 12/2009 | Thelen et al. |

OTHER PUBLICATIONS

Notice of Allowance & Fee(s) Due Mailed Nov. 22, 2013 in Co-Pending U.S. Appl. No. 12/143,592 of Thelen, R., et al., filed Jun. 20, 2008.

International Preliminary Report on Patentability for Application No. PCT/US2009/047818 mailed on Dec. 21, 2010, 5 pages.

Memory Mapping and DMA, chapter 15, 2005, pp. 1-52.

* cited by examiner

SYSTEM AND METHOD FOR ACHIEVING HIGH PERFORMANCE DATA FLOW AMONG USER SPACE PROCESSES IN STORAGE SYSTEMS

RELATED APPLICATION

The present application claims the benefit of U.S. patent application Ser. No. 12/143,592, filed on Jun. 20, 2008, which is hereby incorporated by reference in its entirety.

FIELD OF THE INVENTION

At least one embodiment of the present invention pertains to network storage systems, and more particularly, to a network storage server that includes shared read-only memory space among multiple user space processes.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices can be organized into one or more groups of drives (e.g., redundant array of inexpensive drives (RAID)).

A storage server can be configured to service file-level requests from clients, as in the case of file servers used in a network attached storage (NAS) environment. Alternatively, a storage server can be configured to service block-level requests from clients, as done by storage servers used in a storage area network (SAN) environment. Further, some storage servers are capable of servicing both file-level and block-level requests, as done by certain storage servers made by NetApp, Inc. of Sunnyvale, Calif.

It is desirable to provide a fault tolerant storage system. Fault-tolerance or graceful degradation is the property that enables a system to continue operating properly in the event of the failure of (or one or more faults within) some of its components. One way of providing fault tolerance in a storage system is by redundancy, i.e. providing multiple identical instances of the same system/data and switching to one of the remaining instances in case of a failure (failover). Implementations of RAID, redundant array of independent disks are examples of a fault-tolerant storage device that uses data redundancy. Another way of providing fault tolerance is by fault isolation. When a failure occurs, the system must be able to isolate the failure to the offending component.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for sharing a read-only address space among multiple processes to improve network storage server performance are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

In one embodiment, multiple storage servers can operate as a group to provide fault tolerance. Fault tolerance is a functionality to enable a system to continue operation, possibly at a reduced level (also known as graceful degradation), rather than failing completely, when some part of the system fails. To accomplish fault tolerance, multiple storage servers can be connected to hardware devices through hypervisor so that one server can continue to operate when the other server is inoperable for some reason. A hypervisor or virtual machine monitor is a virtualization platform that allows multiple operating systems to run on a host computer at the same time. However, this can cause system latency from hypervisor processing and contention among multiple storage servers to access hardware devices. These undesirable effects can prevent the storage system from performing at the maximum efficiency.

As described below, fault isolation capabilities made available by user space can be provided in a high-performance embedded network storage system while retaining high performance of kernel level processes. A user space is the memory area where user mode applications work. The kernel is the central component of computer operating systems (OS). The kernel's responsibilities include managing the system's resources (the communication between hardware and software components). By giving user space processes direct access to specific devices (e.g., Network Interface Cards and storage adapters), processes in user space can initiate Input/Output requests without issuing system calls (and entering kernel mode).

The multiple user space processes can initiate requests serviced by a user space device driver by sharing a read-only address space that maps the entire physical memory one-to-one. In addition, a user space process can initiate communication with another user space process by use of transmit and receive queues that work nearly identically to transmit and receive queues used by hardware devices. A mechanism of ensuring that virtual addresses that work in one address space reference the same physical page in another address space can be used to accomplish better efficiency.

Figure 1:
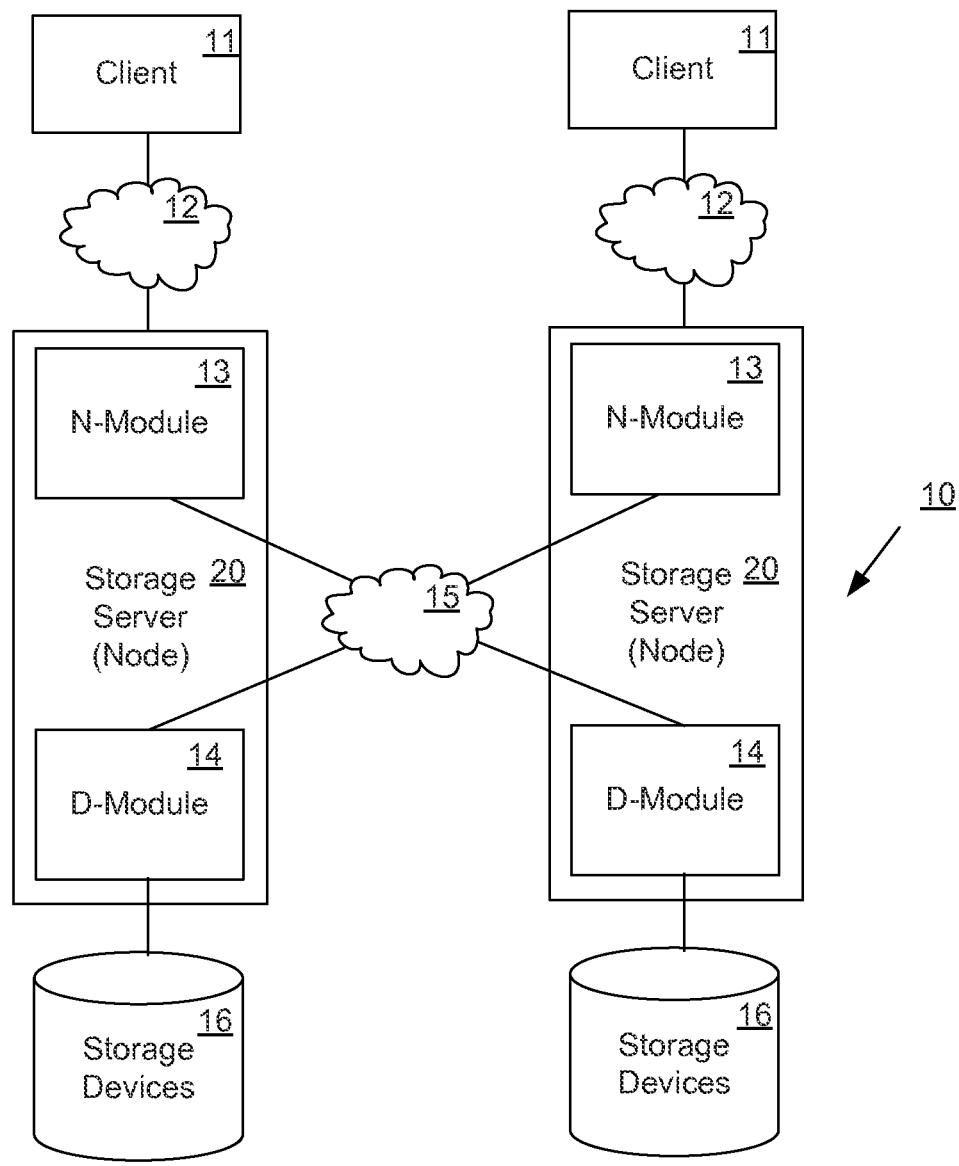
FIG. 1 illustrates a network storage system in which the present invention can be implemented.

Refer now to FIG. 1, which shows a network storage system in which the present invention can be implemented. In FIG. 1, a plurality of storage servers (storage servers) 20 are interconnected as a cluster 10 and configured to provide data storage service to clients 11, relating to the organization of information on storage devices 16. The storage servers 20 comprise various functional components that cooperate to provide a distributed storage system architecture of the cluster 10. The storage servers 20 are coupled to storage devices 16, and a set of clients 11 through interconnect 12. The interconnect 12 can be, for example, a local area network (LAN), wide area network (WAN), metropolitan area network (MAN), global area network such as the Internet, a Fibre Channel fabric, or any combination of such interconnects. Each of the clients 11 can be, for example, a conventional personal computer (PC), server-class computer, workstation, handheld computing/communication device, or the like.

Storage of data in the storage devices 16 is managed by each storage server 20. For example, a storage server 20 receives and responds to various read/write requests from the clients 11, directed to data stored in or to be stored in the storage devices 16. The mass storage devices 16 can be, for example, conventional magnetic or optical disks or tape drives; alternatively, they can be non-volatile solid-state memory, such as flash memory. The mass storage devices 16 can be organized as a Redundant Array of Inexpensive Disks/Devices (RAID), in which case the storage server 20 accesses the storage devices 16 using one or more well-known RAID protocols.

The storage server 20 can be a file-level server such as used in a NAS environment, a block-level storage server such as used in a SAN environment, or a storage server which is capable of providing both file-level and block-level service. Further, the storage server 20 has a distributed architecture. For example, the storage server 20 includes physically separate network modules, e.g., N-module 13 and disk module, e.g., D-module 14, which communicate with each other over an external interconnect.

The N-Module 13 includes functionality that enables the storage server 20 to connect to clients 11 over a computer network 12, while the D-module 14 connects to one or more storage devices 16, e.g. disks of a disk array. D-module 14 also includes storage management functions, such as a file system manager or other form of data layout engine. The storage servers 20 are interconnected by a cluster switching fabric 15 which, in the illustrative embodiment, can include a Gigabit Ethernet switch. An exemplary distributed file system architecture is generally described in U.S. Patent Application Publication No. U.S. 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-Modules in the illustrative cluster 10, there can be differing numbers of N- and/or D-Modules in accordance with various embodiments of the present invention. For example, there can be a plurality of N-Modules and/or D-Modules interconnected in a cluster configuration 10 that does not reflect a one-to-one correspondence between the N- and D-Modules. As such, the description of a storage server 20 comprising one N-Module and one D-Module should be taken as illustrative only.

The clients 11 can be general-purpose computers configured to interact with the storage server 20 in accordance with a client/server model of information delivery. That is, each client 11 can request the services of the storage server, and the storage server can return the results of the services requested by the client, for example by exchanging packets over the network 12. A client 11 can issue packets according to file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client can issue packets according to block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
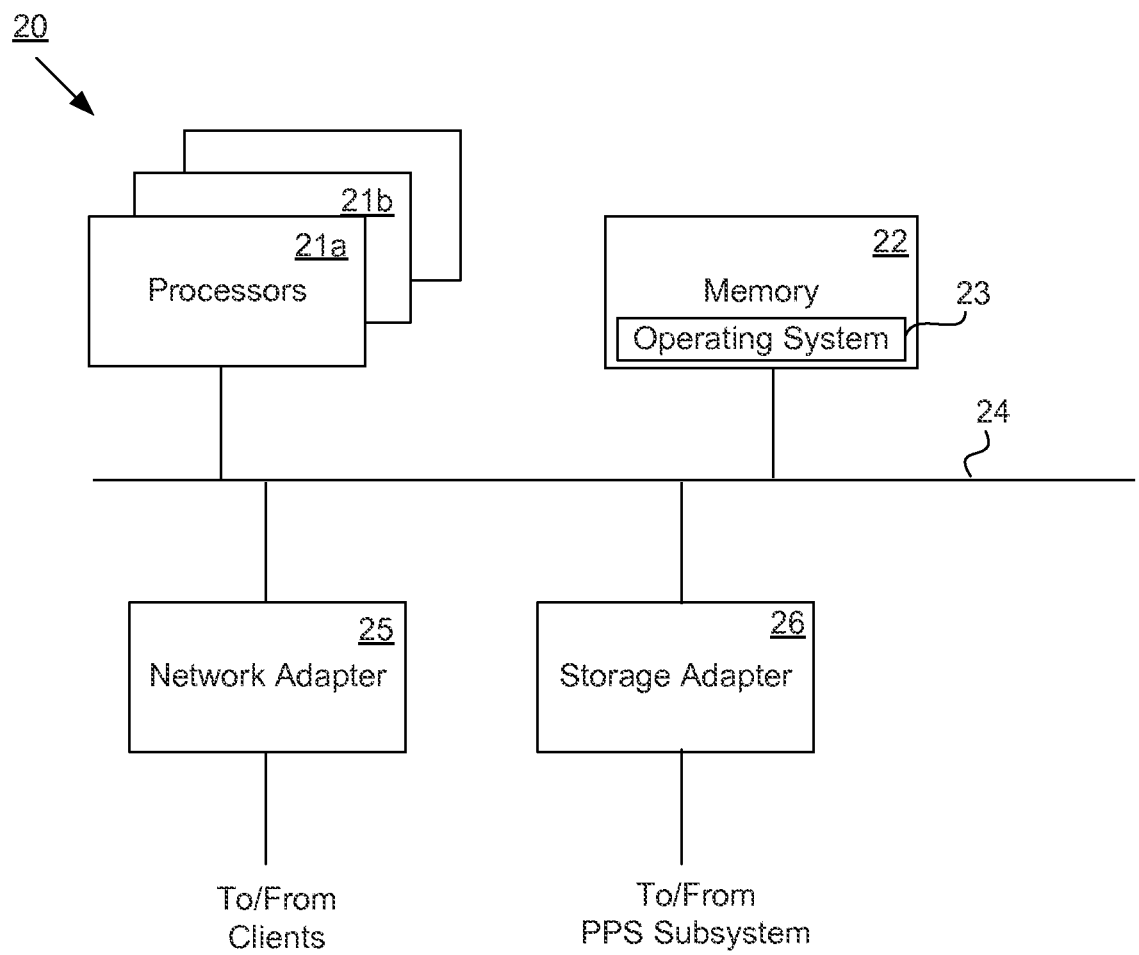
FIG. 2 is a high-level block diagram showing an example of the architecture of a storage server.

FIG. 2 is a schematic block diagram of a storage server 20 that is illustratively embodied as a storage system comprising a plurality of processors 21a,b, a memory 22, a network adapter 25, and a storage adapter 26 interconnected by an interconnect 24. Each storage server 20 is illustratively embodied as a multi processor storage system executing a storage operating system 23 that preferably implements a high-level module, such as a file system manager (not shown). The storage server 20 logically organizes the information as a structure of named data containers, such as volumes, directories, files and/or Logical Unit Numbers (LUNs) on the storage devices 16.

The interconnect 24 shown in FIG. 2 is an abstraction that represents any one or more separate physical buses, point-to-point connections, or both connected by appropriate bridges, adapters, or controllers. The interconnect 24 can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 21a,b can include central processing units (CPUs) of the storage server (storage server) 20 and, thus, control the overall operation of the storage server 20. In certain embodiments, the processor(s) 21 accomplish this by executing software or firmware stored in memory 22. The processor(s) 21 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices. Illustratively, one processor 21a can execute the functions of the N-Module 13 on the storage server, while the other processor 21b can execute the functions of the D-Module 14.

The memory 22 illustratively comprises storage locations that are addressable by the processors and adapters for storing software program code and data structures associated with the present invention. The processor and adapters can, in turn, comprise processing elements and/or logic circuitry configured to execute the software code and manipulate the data structures. The memory 22 is or includes the main memory of the storage server 20. The memory 22 represents any form of random access memory (RAM), read-only memory (ROM), flash memory, or the like, or a combination of such devices. In use, the memory 22 can contain, among other things, at least a portion of the storage operating system 23 of the storage server 20. A storage operating system 23 functionally organizes the storage server 20 by, inter alia, invoking storage operations in support of the storage service implemented by the storage server 20. It will be apparent to those skilled in the art that other processing and memory means, including various types of computer readable media, can be used for storing and executing program instructions pertaining to the invention described herein.

The network adapter 25 comprises a plurality of ports adapted to couple the storage server 20 to one or more clients 11 over point-to-point links, wide area networks, virtual private networks implemented over a public network (Internet)

or a shared local area network, for example. The network adapter 25 thus can comprise the mechanical, electrical and signaling circuitry needed to connect the storage server 20 to the network 12 or 15. Illustratively, the computer network 12 or 15 can be embodied as an Ethernet network or a Fibre Channel (FC) network. Each client 11 can communicate with the storage server over network 12 or 15 by exchanging discrete frames or packets of data according to pre-defined protocols, such as TCP/IP.

The storage adapter 26 cooperates with the storage operating system 23 executing on the storage server 20 to access information requested by the clients 11 and to write data in response to clients' requests. The information can be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the storage devices 16, e.g. disks. The storage adapter 26 comprises a plurality of ports having input/output (I/O) interface circuitry that couples to the disks over an I/O interconnect arrangement, such as a conventional high-performance, FC link topology.

Storage of information on storage devices 16 can be implemented as one or more storage "volumes" that comprise a collection of physical storage disks cooperating to define an overall logical arrangement of volume block number (VBN) space on the volume(s). Each logical volume is generally, although not necessarily, associated with its own file system. The disks that form a logical volume/file system are typically organized as one or more groups, wherein each group can be operated as a Redundant Array of Independent (or Inexpensive) Disks (RAID).

One method to provide a fault tolerant system is to use a hypervisor to allow multiple storage Operating Systems (OS's) to operate in a redundant manner. A hypervisor or virtual machine monitor is a virtualization platform that allows multiple operating systems to run on a host computer at the same time. Hypervisors can be classified in two types:
1. Software that runs directly on a given hardware platform (as an operating system control program). A guest operating system thus runs at the second level above the hardware. A variation of this is embedding the hypervisor in the firmware of the platform.
2. Software that runs within an operating system environment. A "guest" operating system thus runs at the third level above the hardware.

A "guest" operating system could access services directly from the (higher-level) control Program—analogous to making a "supervisor call" to the (same level) operating system.

Figure 3:
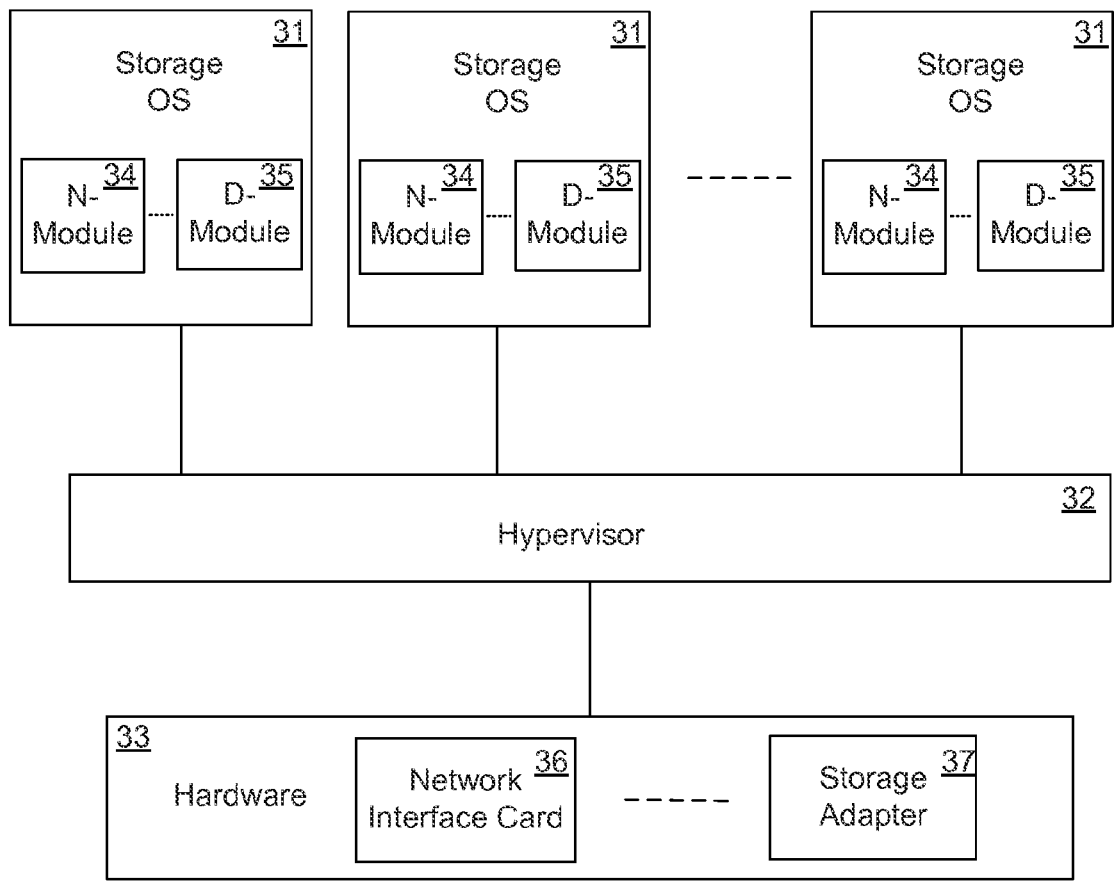
FIG. 3 illustrates an example of storage system configuration with multiple operating systems (OS's) connected to hardware devices through a hypervisor for fault tolerant system implementation.

FIG. 3 illustrates an example of storage system configuration with multiple storage OS's connected to hardware devices through a hypervisor for fault tolerant system implementation. In FIG. 3, multiple network storage OS's 31 are connected to hardware 33 (e.g. network interface card 36, storage adapter 37, etc) through hypervisor 32. Each network storage server 31 has an N-module 34 and a D-module 35.

To provide a fault tolerant storage system by fault isolation, multiple storage OS's 31 are connected to hardware devices 33 through hypervisor 32 so that one storage OS can continue to operate when another OS is inoperable for some reason. However, this system configuration can cause contention among multiple storage OS's 31 to access hardware devices 33 and latency caused by OS having to go through hypervisor, preventing the storage system from performing at the maximum efficiency.

Another method of providing fault tolerance is using symmetric multiprocessing. Symmetric multiprocessing, or SMP, is a multiprocessor computer architecture where two or more identical processors are connected to a single shared main memory. SMP systems allow any processor to work on any task no matter where the data for that task are located in memory; with proper operating system support, SMP systems can easily move tasks between processors to balance the workload efficiently. SMP has been a model for certain system designs, but its basic design was to leverage a large amount of work over a small number of processors. When there is relatively little work to be performed by a large number of processors, then the system design should change. SMP systems are complicated to write and debug; single threaded applications are easier to design and debug. The SMP model suggests pushing more and more functionality into the kernel, or else that component will incur a Translation Lookaside Buffer (TLB) miss when it switches to the kernel for services. However, putting too much functionality into the kernel layer requires users to reboot systems upon upgrade of even the simplest subsystem.

Excessive Symmetric Multi-Processing (XSMP) is one embodiment of the present invention. XSMP is designed around the notion of the embedded system but with the features of fault isolation present. An embedded system is a special-purpose computer system designed to perform one or a few dedicated functions. An example is a dedicated network storage server. As an embedded system, creating a high degree of isolation between separate instances of operating systems as with a hypervisor is not necessary.

XSMP is a system structure which efficiently utilizes processors and benefits from fault isolation. The model is structural, and many systems can be constructed using the model. One embodiment of XSMP is a system where multiple processors work efficiently in an asymmetric manner, passing data via high performance synchronous, non-blocking communication queues. One or more processors are assigned to performing work on each task and each task has its own address space and runs at a processor level above the kernel space, e.g., in user space. This model is made efficient with processors spinning on the receipt of data from other processors. While busy wait loops are typically shunned in system design, the rules are different when the number of processors is large.

In general, a processing system is composed of various software components (or processes). Each component is comprised of an address space and execution context. XSMP can be implemented using trusted components, shared address space (not necessarily writable by all components), a synchronous non-blocking communication mechanism between components (based on simple, low over-heard producer, consumer queues), one or more dedicated CPU cores with each component, and minimal functionality provided by the underlying O/S or hypervisor. In XSMP, the components do not use interrupts when dealing with devices or other components. In XSMP, components can generate an address which maps to the same data from other components. Also, synchronous non-blocking mechanism maintains locality: by not using a signaling mechanism, user code does not begin executing a signal handler asynchronously.

The idea of creating isolation is valuable from the point of view of creating resiliency in the face of software bugs. However, with performance being such an important part of system design, it's necessary to specifically address the data flow from one process (component or module) to another. The XSMP architecture is a way of designing a system to attain both fault isolation and high performance. The fault isolation is achieved by assigning major functional areas their own address space.

XSMP processes have a view on all of main memory. The benefit of this is so that virtual addresses to data in one address space can be passed to another address space. For example, a process will perform a virtual to physical address translation and then hand the physical address to another process. However, because there is a mapping of all main memory in virtual address space, the high order address bits are set so that the physical address becomes a valid virtual address that points to exactly the same location. XSMP processes have their Memory Management Unit (MMU) page tables visible within their address space: the page table is viewable through the read-only address space of all of main memory.

Also, in XSMP, communication between components is implemented by using full-duplex producer/consumer communication queue. Each component's functionality is derived by the contents and order of its in-bound queues. The output of the component is reflected in the out-bound queues.

Figure 4:
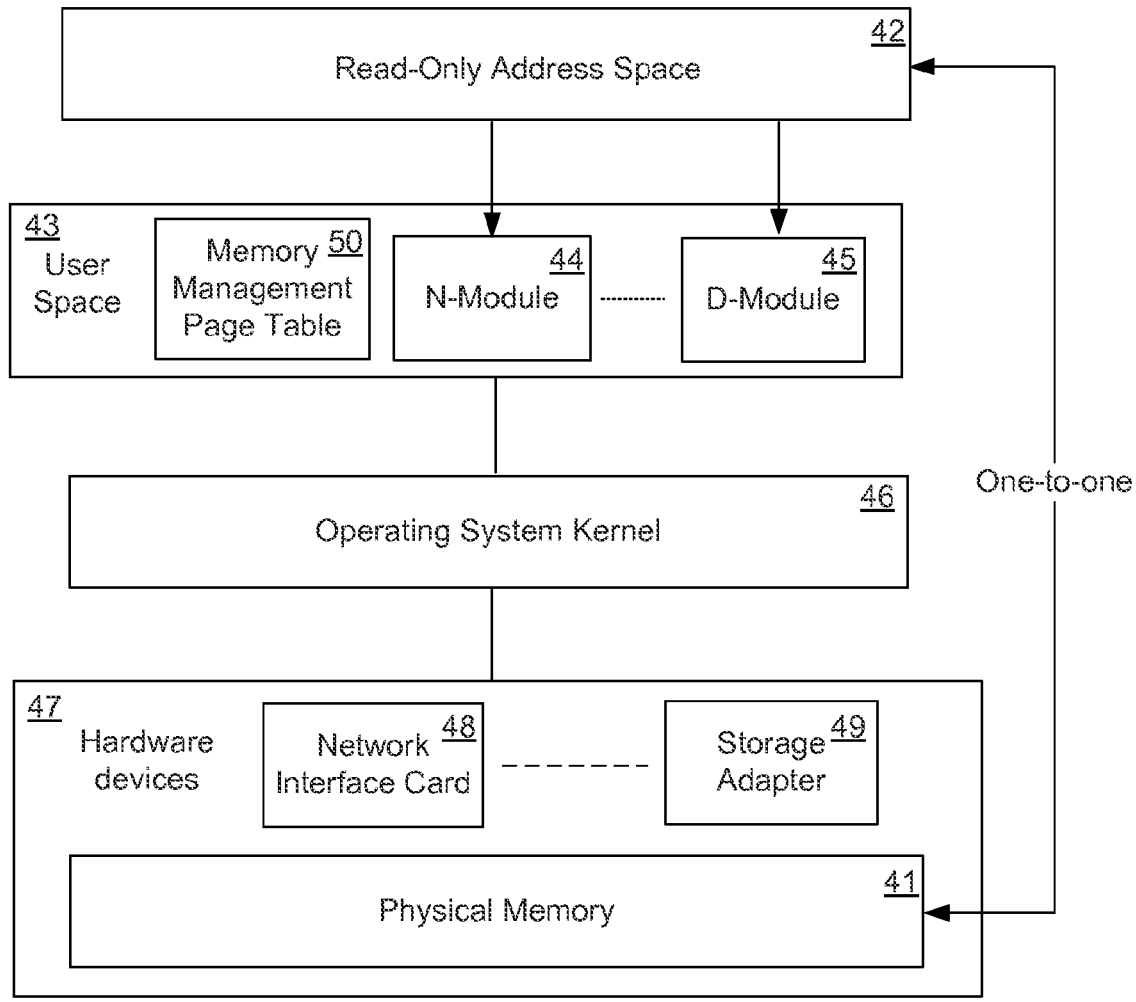
FIG. 4 illustrates an embodiment of Excessive Symmetric Multi-Processing (XSMP), sharing a read-only address space mapping the entire physical memory among multiple processes.

FIG. 4 illustrates an embodiment of Excessive Symmetric Multi-Processing (XSMP), sharing a read-only address space mapping the entire physical memory of a storage system among multiple processes. XSMP has user space 43 portions and operating system kernel space 46 portions. User space 43 is the memory area where user mode applications work and includes a memory management page table 50. The user space 43 can be divided among multiple processes for different tasks. Processes, e.g. N-module 44 and D-module 45 are put in the user space 43 by occupying a portion of the memory area of user space 43. The processes 44 and 45 in user space 43 share a read-only (RO) address space 42. The Multiple processes (e.g. multiple N-modules 44 and D-modules 45) can access hardware devices 47 (e.g. network interface card 48, storage adapter 49, physical memory 41, etc.) by sharing the read-only address space 42 that maps the entire physical memory 41 one-to-one. The procedures are explained in the following paragraphs.

Figure 5:
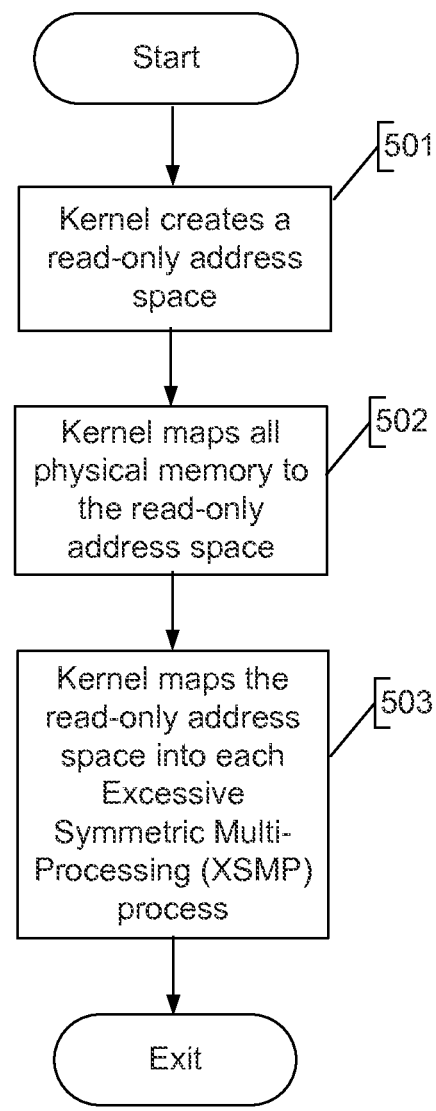
FIG. 5 is a flow diagram showing a process in a storage server for sharing read-only address space.

FIG. 5 is a flow diagram showing a process in a storage server for sharing read-only address space. At 501, the kernel 46 creates a new, read-only address (ROA) space in which all of physical memory 41 is mapped. The ROA is used during the data flow portion of an XSMP-designed system as explained below. At 502, the kernel maps the entire physical memory to the read-only address space. At 503, the kernel maps the read-only address space into each XSMP process. Because each process can independently access hardware device using shared read-only address space, an error at a user space process can be isolated from another process. For example, if an XSMP process with direct access to a hardware device prematurely terminates because of an illegal instruction, divide by 0, touching an unmapped address, etc., the kernel can recreate the process. Then the kernel notifies any other XSMP processes which had communications with the terminated XSMP process.

At the same time, latency and contention among processes to access hardware devices is less of an issue because each process can independently request to access hardware devices, subject to the efficiency of hardware devices themselves. By isolating each process using shared read-only address space that maps the entire physical memory, fault tolerant system can be implemented without sacrificing performance efficiency.

For example, assume a machine with 1 GB of physical memory with a 30 bit address range and the address range is 0x 0000_0000 to 0x 3FFF_FFFF. Further, assume a virtual address 0x 0012_3000, the physical address that backs 0x 0012_3000 is 0x 3456_7000, and a mapping for physical memory starting at address 0xC000_0000, i.e., if the two high order address bits are set, then the virtual address maps directly to physical memory with the same offset as the low order 30 bits. If the high order two address bits are set, then the address becomes: 0F456_7000.

Processes begin as normal processes, but as soon as a process requests XSMP services, then the kernel 46 tags it as an XSMP process. In one embodiment, the XSMP process features include:

1. Physically contiguous memory on a per page directory basis. In an Intel PAE environment (36 bit physical addressing extension) that would be a 2 MB basis. In a non-PAE environment, it is a 4 MB basis. On other processor architectures, the basis can be different.
2. The MMU is mapped into the process as read-only. With this feature, processes can perform virtual to physical address translation.
3. Read-only address access to the entire physical address range. The high order N bits of the virtual address of the RO address space is non-zero. This allows other processes that receive the RO address of one process to be able to identify the source process of that address. However, in another embodiment, the high order bits of the RO address do not need to contain the process identification of the originating XSMP process from which the RO address was computed.
4. An XSMP process specific data structure for kernel to process communication. In this mode there is a region of memory where the kernel can communicate information with the XSMP process, including termination of other XSMP processes, requests for resource changes (e.g. increase/decrease in memory, request for add/delete of processors), etc. However, there is certain kernel to process communication which is unavoidably synchronous and can not be issued through communication channels. For example, if a process executes a divide by 0, the processor will take an exception and run kernel code. One method is for processes to either install a signal handler for divide by 0 (and other traps) to handle the error or to not handle the error in which case the kernel will immediately terminated the XSMP process.

In the design of XSMP, synchronous non-blocking I/O is used to achieve high performance. Synchronous non-blocking I/O is a send of a request to another process (or system component) and then polling for a response, as opposed to blocking. The blocking involves waiting for an interrupt. The polling occurs in the context of the process scheduler. For a cooperatively based system, interrupts only serve to cause the scheduling of a process. That process will run no sooner than the next time the scheduler runs (and there can be higher priority processes, for example). Thus, if the scheduler is written to check a list of completion notifications, then it has the same effect as an interrupt without the TLB effects and other CPU instruction obstruction.

Figure 6:
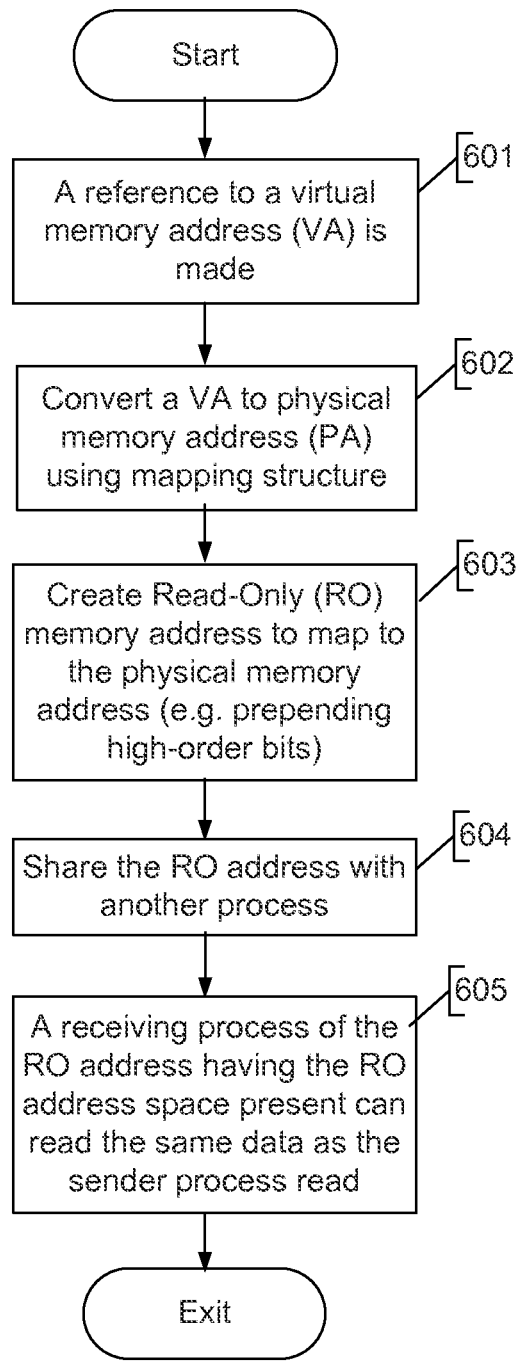
FIG. 6 is a flow diagram showing a process in a storage server for data flow using the shared read-only address space.

FIG. 6 is a flow diagram showing a process in a storage server for data flow using the shared read-only address space. In the data flow of XSMP, a virtual memory address (VA) referenced in an application is converted to a physical address (PA), then to a read-only (RO) address space.

At 601, a reference to a VA is made in a process. The VA is produced by a source XSMP process when the process needs to make the address of a memory region to be visible to another XSMP process. An example is when a memory buffer is to be written to disk or transmitted over the network. The address of the buffer is a virtual address constructed by the source XSMP process.

At 602, the VA is converted to a PA using a mapping structure. The PA is constructed by software using processes including "walking the page table" which is a process well understood by one skilled in the art of operating system theory. (Generally, this is a process of looking up page table elements in the page table using as indexes into the various tables components of the virtual address.) Another way of converting a virtual address to a physical address is to use a recursive page table entry.

At 603, a read-only memory address is created by the XSMP process by taking the physical address, which is the output of 601 and then taking on the high order bits. Those high order bits may be the same across all processes or they may be different to distinguish the source XSMP process from which the RO address originated. For example, assume that in a 64 bit address space, a process is given reference to a virtual memory address for data. Further, assume that the virtual addresses 0x 0000_Fxxx_xxxx_xxxx map all of physical memory. Once a process converts an address from its regular VA to PA, then the process can prepend the bits 0x 0000_F to the high-order bits of the address (which would necessarily not have any of those bits set, because physical addresses are well below that address) to create an RO version of the address to the data referenced.

Then at 604, the process which has performed this operation shares this new RO address with one or more other processes. For example, at 605, the receiving process of the RO address will have the RO address space present, if the process is XSMP enabled. The receiving process can read the same data as the sender process had read.

Figure 7:
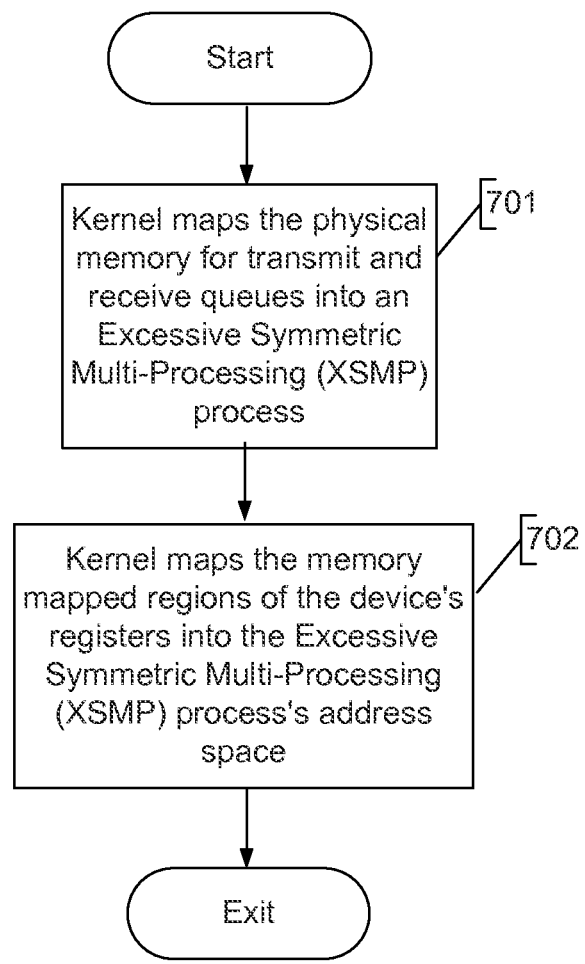
FIG. 7 is a flow diagram showing a process by the kernel in a storage server for enabling an XSMP process to access a physical device.

FIG. 7 is a flow diagram showing a process by the kernel in a storage server for enabling an XSMP process to access a physical device. At 701, the kernel maps the physical memory for transmit and receive queues into the XSMP process. At 702, the kernel maps the memory mapped regions of the device's registers into the XSMP process's address space. An XSMP process with these attributes is an XSMP device driver.

Another aspect of XSMP is that a kernel which supports the XSMP architecture needs to give additional support to the applications that run on XSMP. For example, XSMP processes are assumed to have their own separate threading model and scheduler. In one embodiment, XSMP uses a cooperatively scheduled threading model. When a process needs to be categorized as an XSMP process, that process will request additional XSMP services from the kernel. The application can make all of its own scheduling decisions and will not yield the CPU to the kernel during normal operation, including not executing interrupt service routines (ISRs) on a processor running an XSMP process. Also, XSMP processes will have direct access to and modify its own MMU page tables (the real page tables the CPU is looking at). This allows the process to perform virtual to physical translations and to map and unmap pages that have come from other domains. However, it should be noted that in another embodiment, a system can deliver interrupts to XSMP processes, and/or XSMP processes do not modify the MMU page tables.

Therefore, the kernel in one embodiment of XSMP has the following aspects:

1. There is no interrupt generation for maintaining locality: interrupt service routines are not executed on CPUs running components.
2. Synchronous non-blocking kernel communication: Components do not have to switch into the kernel via a system trap. In addition, components are designed such that component to kernel transitions are minimal, and many kernel requests can be made without blocking, waiting for a response.
3. Notifications of started/terminated components using unobtrusive notifications (i.e., not signals): Components can need to be aware of status changes among other components within the system; the notifications do not require interrupt or signal notification, but can be communicated via other existing methods.

All XSMP processes either receive requests from other processes (XSMP or not), generate requests for other processes, or directly control an adapter driver. An XSMP process registers itself with the kernel so that other processes can find that process. The notification about other XSMP processes is via a request queue from the kernel.

Figure 8:
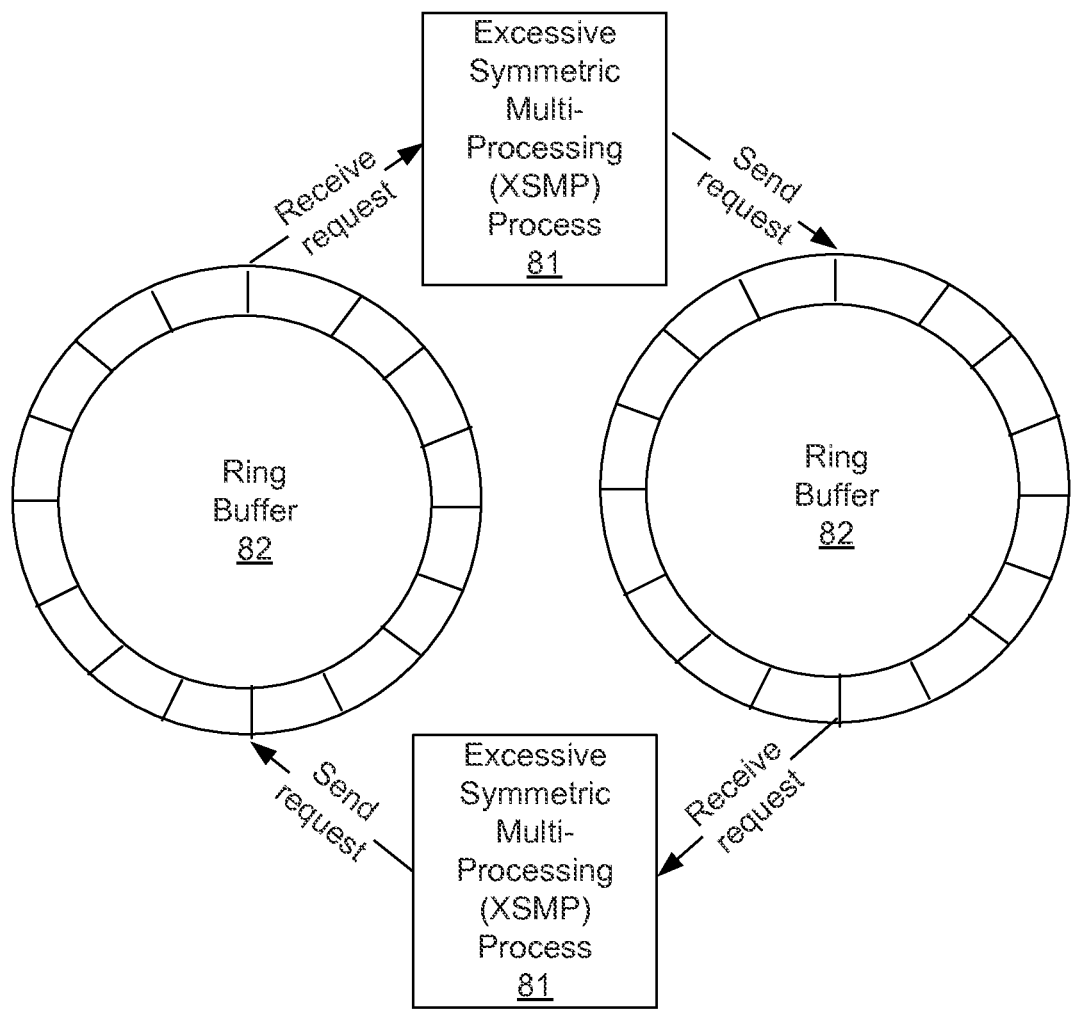
FIG. 8 illustrates two XSMP processes communicate with each other through common ring buffers.

FIG. 8 illustrates two XSMP processes communicate with each other through common ring buffers. A ring (circular) buffer is a data structure that uses a single, fixed-size buffer as if it were connected end-to-end. This structure can be used for buffering data streams. XSMP processes 81 communicate using the ring buffers 82 that contain a number of entries (the number of entries is not architectural and can be negotiated by the two end points) and a "new data has arrived" bit. Each ring buffer 82 is unidirectional. One process 81 generates requests onto the ring buffer and the receiving process picks up those requests. A data ring and a command ring can be implemented as different ring buffers. It should be noted that the above communication method between two XSMP processes is only for illustrative purpose only, and a different communication method can be implemented.

An XSMP process can ask the kernel for references to other processes that have registered themselves. Also, in one embodiment, the kernel does not assign interrupts to execute on any processors handed to XSMP processes. This includes the timer interrupt. Therefore, the processors running XSMP processes run XSMP processes until such time as the process calls into the kernel or crashes (e.g., divide by 0, touching an illegal address, issuing an illegal instruction). In addition, an XSMP processes can have write access to their MMU structures.

Therefore, in one embodiment of XSMP, context-switch free component model is used: components do not jump around because of signals, nor does the CPU executing component code arbitrarily begin executing interrupt service routines on behalf of the kernel. By including the MMU page tables in the address space of the component, the component can translate a virtual address to a physical address without a context switch to the kernel. However, it should be noted that in another embodiment of XSMP, a system can deliver interrupts to the XSMP process.

Thus, a method and system for sharing a read-only address space among multiple user space processes to improve network storage server performance are described. The techniques introduced above can be implemented in special-purpose hardwired circuitry, in software and/or firmware in conjunction with programmable circuitry, or in a combination thereof. Special-purpose hardwired circuitry can be in the form of, for example, one or more application-specific integrated circuits (ASICs), programmable logic devices (PLDs), field-programmable gate arrays (FPGAs), etc.

Software or firmware to implement the techniques introduced here can be stored on a machine-readable medium and can be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer system comprising:
   a host operating system kernel running at a first logical level above a hardware level of the computer system, wherein no intervening level exists between the first logical level and the hardware level of the computer system;
   a physical memory;
   a physical hardware device operating at the hardware level of the computer system,
   a read-only address space mapped to the physical memory, the read-only address space shared by multiple fault-isolated processes; and
   multiple processors to collectively execute the processes, wherein each of the processes operates logically above the host operating system kernel and is configured to communicate with other processes and the hardware device using the read-only address space without issuing system calls to the host operating system kernel.

2. The computer system of claim 1, wherein the processes are in a user space.

3. The computer system of claim 1, wherein the read-only address space maps to the entire physical memory.

4. The computer system of claim 1, wherein the computer system is an embedded system environment.

5. The computer system of claim 1, wherein the processes include an N-module and a D-module, wherein the N-module communicates with clients, the D-module communicates with storage devices, and the N-module and D-module communicate with each other by sharing the read-only address space.

6. The computer system of claim 1, wherein the processes communicate asynchronously with each other.

7. The computer system of claim 1, wherein the hardware device is a network interface card.

8. The computer system of claim 1, wherein the hardware device is a storage adapter.

9. The computer system of claim 1, wherein each process has a separate threading model from the host operating system kernel.

10. The computer system of claim 1, wherein each process has a separate scheduler from the host operating system kernel.

11. The computer system of claim 1, wherein the host operating system kernel does not interrupt the process.

12. The computer system of claim 1, wherein the kernel uses unobtrusive notifications instead of interrupt or signal notification for notifications of started and terminated processes.

13. The computer system of claim 1, wherein the multiple fault-isolated 3processes comprises Excessive Symmetric Multi-Processing (XSMP) processes.

14. A non-transitory computer readable storage medium having programming instructions stored thereon, wherein the instructions, when executed by a processor of a computer system, cause the computer system to:
   direct a host operating system kernel running at a first logical level above a hardware level of a network storage system to create a read-only address space, wherein no intervening level exists between the first logical level and the hardware level of the network storage system;
   map a physical memory of the network storage system to the read-only address space;
   share the read-only address space among multiple fault-isolated processes, wherein multiple processors collectively execute the processes, the processes operate logically above the host operating system kernel, and the processes communicate with each other by using the read-only address space without issuing system calls to the host operating system kernel; and
   allow the process to directly access a physical hardware device running at the hardware level of the computer system without issuing system calls to the host operating system kernel.

15. The computer readable storage medium of claim 14, wherein the instructions, when executed by the processor, further cause the computer system to: use a separate scheduler from the kernel for each process.

16. The computer readable storage medium of claim 14, wherein the instructions, when executed by the processor, further cause the computer system to: use a separate threading model from the kernel for each process.

17. The computer readable storage medium of claim 14, wherein the instructions, when executed by the processor, further cause the computer system to: use unobtrusive notifications for notifications of started and terminated processes instead of interrupt or signal notification.

18. The computer readable storage medium of claim 14, wherein the processes operate in an embedded system environment.

19. The computer readable storage medium of claim 14, wherein the multiple fault-isolated processes comprises Excessive Symmetric Multi-Processing (XSMP) processes.

20. A non-transitory computer readable storage medium having programming instructions stored thereon, wherein the instructions, when executed by a processor of a computer system, cause the computer system to:
   create a read-only address space by operation of a host operating system kernel running at a first logical level above a hardware level of a network storage system, wherein no intervening level exists between the first logical level and the hardware level of the network storage system;
   map a physical memory of the network storage system to the read-only address space;
   share the read-only address space among multiple fault-isolated processes, wherein multiple processors collectively execute the processes, the processes operate logically above the host operating system kernel in an embedded system environment, the processes communicate with each other using the read-only address space without issuing system calls to the host operating system kernel, and each of the processes uses a separate threading model from the host operating system kernel;
   allow the processes to directly access a physical hardware device running at the hardware level of the computer system without issuing system calls to the host operating system kernel; and
   use unobtrusive notifications for notifications of started and terminated processes
   instead of interrupt or signal notification.

21. The computer readable storage medium of claim 20, wherein the processes communicate with each other asynchronously.

22. The computer readable storage medium of claim 20, wherein the multiple fault-isolated processes comprises Excessive Symmetric Multi-Processing (XSMP) processes.

* * * * *